United States Patent

Chan

[19]

[11] Patent Number: 6,021,307
[45] Date of Patent: Feb. 1, 2000

[54] INFORMATION DISTRIBUTION AND PROCESSING SYSTEM

[76] Inventor: Hark C. Chan, 861 Brent Dr., Cupertino, Calif. 95014

[21] Appl. No.: 08/939,368

[22] Filed: Sep. 29, 1997

Related U.S. Application Data

[63] Continuation-in-part of application No. 08/644,838, May 10, 1996, which is a continuation-in-part of application No. 08/279,424, Jul. 25, 1994, abandoned, and a continuation-in-part of application No. 08/255,649, Jun. 8, 1994, abandoned, which is a continuation-in-part of application No. 08/224,280, Apr. 7, 1994, abandoned.

[51] Int. Cl.[7] ............................................. H04H 1/00
[52] U.S. Cl. ............................................. 455/3.1
[58] Field of Search ........................... 455/3.1, 6.2, 450; 348/9, 10

[56] References Cited

U.S. PATENT DOCUMENTS

| | | |
|---|---|---|
| 3,824,597 | 7/1974 | Berg . |
| 3,967,202 | 6/1976 | Batz . |
| 4,081,832 | 3/1978 | Sherman . |
| 4,191,860 | 3/1980 | Weber . |
| 4,307,416 | 12/1981 | Spano . |
| 4,563,702 | 1/1986 | Heller . |
| 4,635,113 | 1/1987 | Okada et al. . |
| 4,734,858 | 3/1988 | Sclafy ..................................... 364/408 |
| 4,742,544 | 5/1988 | Kupnicki et al. ......................... 380/14 |
| 4,827,508 | 5/1989 | Shear . |
| 4,965,825 | 10/1990 | Harvey et al. . |
| 5,010,571 | 4/1991 | Katznelson . |
| 5,128,981 | 7/1992 | Tsukamoto et al. ....................... 379/58 |
| 5,132,680 | 7/1992 | Tezuka et al. ....................... 340/825.08 |
| 5,185,794 | 2/1993 | Thompson et al. ...................... 380/17 |
| 5,208,671 | 5/1993 | Tarrant .................................... 358/147 |
| 5,208,857 | 5/1993 | Lebrat ..................................... 380/14 |
| 5,237,411 | 8/1993 | Fink et al. ............................... 358/146 |
| 5,239,540 | 8/1993 | Rovira et al. ............................. 370/77 |
| 5,247,347 | 9/1993 | Litteral et al. . |
| 5,247,575 | 9/1993 | Sprague et al. . |
| 5,319,707 | 6/1994 | Wasilewski et al. ..................... 380/14 |
| 5,321,748 | 6/1994 | Zeidler et al. ............................ 380/14 |
| 5,321,750 | 6/1994 | Nadan ..................................... 380/20 |
| 5,323,148 | 6/1994 | Olazabal et al. ................... 340/825.44 |
| 5,327,174 | 7/1994 | Kim ......................................... 348/468 |
| 5,335,275 | 8/1994 | Millar et al. ................................ 380/4 |
| 5,335,278 | 8/1994 | Matchett et al. ............................ 380/23 |
| 5,343,494 | 8/1994 | Averst et al. ............................... 375/1 |
| 5,361,399 | 11/1994 | Linquist et al. ......................... 455/561 |
| 5,377,266 | 12/1994 | Katta et al. ............................... 380/20 |
| 5,388,101 | 2/1995 | Dinkins ................................. 370/95.1 |
| 5,392,023 | 2/1995 | D'Avello et al. ....................... 379/100 |
| 5,432,798 | 7/1995 | Blair ........................................ 371/32 |
| 5,444,769 | 8/1995 | Koen et al. ............................... 379/94 |
| 5,452,356 | 9/1995 | Albert ....................................... 380/9 |
| 5,539,449 | 7/1996 | Blahut et al. .............................. 348/7 |
| 5,629,867 | 5/1997 | Goldman ................................ 364/514 |
| 5,887,243 | 3/1999 | Harvey et al. .......................... 455/3.1 |

OTHER PUBLICATIONS

Yoshiko Hara, "Consortium Eyes Satelite–Based E–Book System", Electronic Engineering Times, Oct., 1998.

John P. Hayes, "Computer Architecture and Organization", pp. 398–421, Jan. 1988.

Cricket Liu, et al., "Managing Internet Information Services", pp. 279–298, Dec. 1994, O'Reilly & Associates, Inc.

S. Deering, "Host Extensions for IP Multicasting", pp. 1–17, Aug. 1989, Network Working Group, Request for Comments: 1112.

David Raggett, HTML+ (Hypertext Markup Language), pp. 1–31, Jul. 12, 1993, WWW Discussion Group Request for Comments.

*Primary Examiner*—William Cumming

[57] ABSTRACT

An information distribution and processing system has a broadcast channel for delivering a first set of digital data and a bi-directional channel for allowing a user to obtain additional information. The additional information is stored in a database. In one embodiment of the present invention, the broadcast channel uses a satellite to broadcast the data. In another embodiment of the invention, the bi-directional channel is a telephone system. At predetermined locations of the first set of digital data, linking references are embedded. If desired, the user can select a linking reference and send a request to the database via the bi-directional channel. The database uses the selected linking reference to search for information, and returns the requested information to the user.

6 Claims, 4 Drawing Sheets

K-S Particle Found

Two physicists announced that they had found the K-S particle. If confirmed, this will verify the theory of the Nobel laureates, Professors Kendrick Chan and Sophia Chan, who first postulated the existence of the K-S particle ten years ago. The physicists, Drs. Lisa Smith and John Doe, showed computer generated results indicating the detection of the K-S particles in a series of experiments carried out at the International Super-High Energy Accelerator.

FIG. 2A

K-S Particle Found¶¶ Two physicists announced that they had found the ϒ'K-S particleϒ'⌘FE330AB⌘. If confirmed, this will verify the theory of the Nobel laureates, Professors ϒ'Kendrick Chanϒ'⌘A245DC8⌘ and ϒ'Sophia Chanϒ'⌘85AC258⌘, who first postulated the existence of the K-S particle ten years ago. The physicists, Drs. ϒ'Lisa Smithϒ'⌘3098BE6z⌘ and ϒ'John Doeϒ'⌘EAC7835⌘, showed computer generated results indicating the detection of the K-S particles in a series of experiments carried out at the ϒ'International Super-High Energy Acceleratorϒ'⌘C347A49⌘.¶

FIG 2B

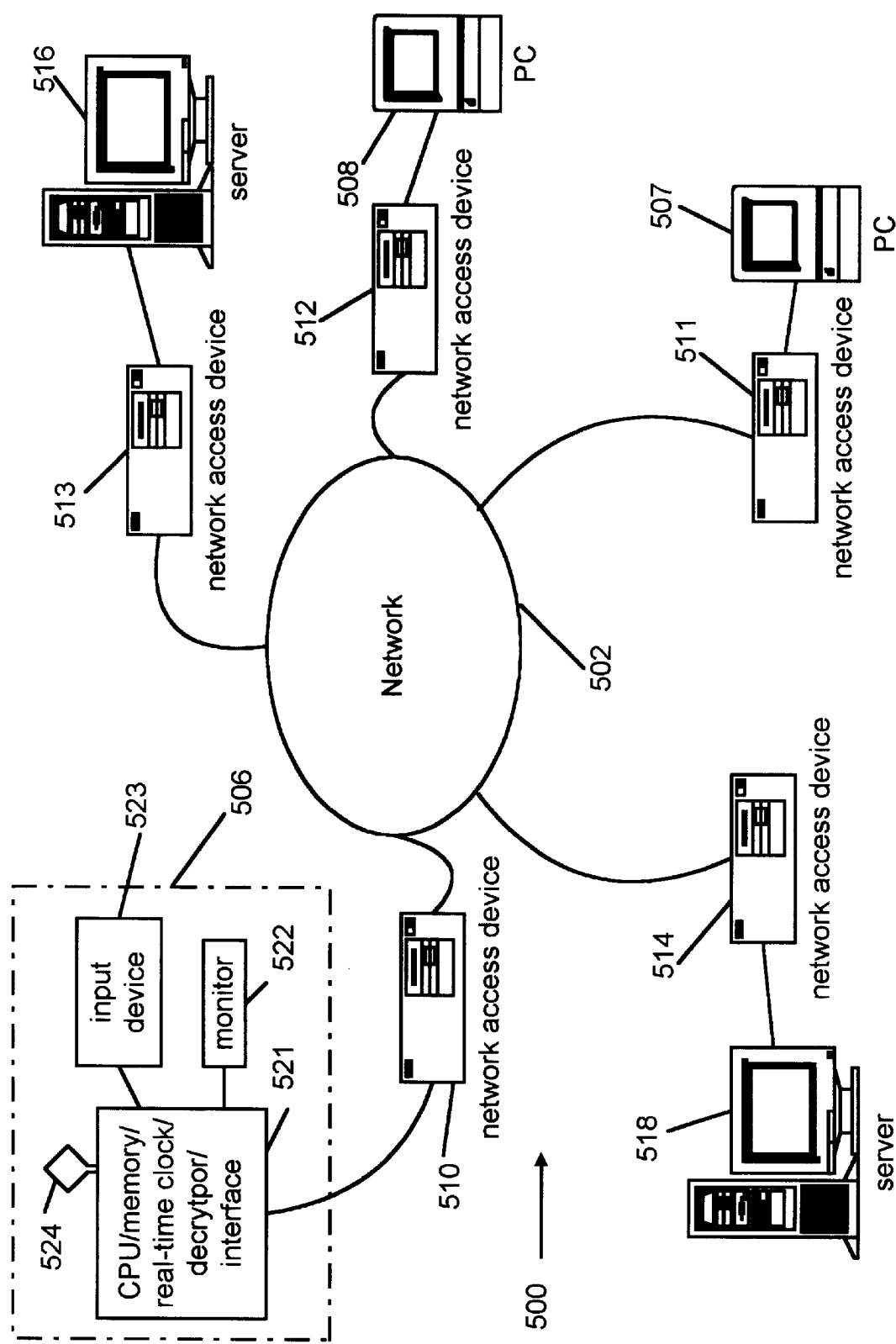

INFORMATION DISTRIBUTION AND PROCESSING SYSTEM

This application is a continuation in part of application Ser. No. 08/644,838 (entitled "Improved Information Distribution System") filed May 10, 1996, which is a continuation in part of application Ser. No. 08/279,424 (entitled "Information Distribution System") filed Jul. 25, 1994, now abandoned. and continuation in part of application Ser. No. 08/255,649 (entitled "Information Distribution and Processing System") filed Jun. 8, 1994, now abandoned, [and] which is a continuation in part of application Ser. No. 08/224,280 (entitled "Efficient Cryptographic Methods and Devices") filed Apr. 7, 1994, now abandoned. [These two patent applications] application Ser. Nos. 08/644.838 and 08/279,424 are incorporated herein by reference.

BACKGROUND OF THE INVENTION

This invention relates generally to information distribution and processing, and more particularly to distributing information using a broadcast channel and a bi-directional communication channel.

Recent advances in modem and computer technology allow large amount of digital data to be transmitted electronically. A number of information providers (such as newspaper and magazine publishers) and on-line information distributors (such as America Online, Dialog and Nexis) have formed partnerships to deliver newspaper and other information on-line. In this system, a subscriber uses a computer and a modem to connect (e.g., through a regular phone line) to the computer of an on-line information distributor. The subscriber can retrieve information, including newspaper articles, stored in the computer of the information distributor.

On-line delivery of newspaper has many advantages. For example, the information can be updated throughout the day while the printed version is printed only once or twice a day. Further, it is possible to do text-based searches on the information. However, it is found that on-line deliver of newspaper and other information is slow. For example, a subscriber has to wait many seconds for a newspaper article to be delivered. The quality of the electronic newspaper is low. For example, in order to reduce storage and communication requirements, graphic images appeared in the printed version are not universally supplied in the on-line version of newspaper. One of the reasons for such poor performance is the limited bandwidth of communication channels used by on-line information distributors. Another reason is that information is centrally processed by the computer at the site of the information distributor, with the result that each subscriber only gets a small slice of the time of the computer.

Another way to communication information on-line is through the Internet, which is a worldwide interconnection of millions of computers, from low end personal computers to high-end mainframes. An important development in the Internet is the World Wide Web (the "Web"). The Web is a wide-area hypermedia information delivery and retrieval system aimed to give universal access to a large universe of documents. When the Web was first developed around 1989, it was known to and used by the academic/research community only as a means for fast disseminating of information. There was no easily available tool which allows a technically untrained person to access the Web. An important development is the release of a Web "browser" around 1993. It has a simple but powerful graphic interface. The browser allows a user to retrieve web documents and navigate the Web using simple commands and popular tools such as point-and-click. Because the user does not have to be technically trained and the browser is easy to use, it has the potential of opening up the Internet to the masses.

A document designed to be accessed and read over the web is called a web page. Each web page must have an address in a recognized format—the URL, or Uniform Resource Locator—that enables computers all over the world to access it. Each web page has an unique URL. A web page typically contains both text and images. It is also possible to include audio and movie data.

The Web faces the same problem as the regular on-line delivery of information. This is because most people use the above described modem to access the Internet. Thus, the data transfer rate of the Web is also limited. Because multimedia data (comprising a combination of text, graphic, video and/or audio) has a large data size, even when compressed, it could take a long time to retrieve a document from the Web. Further, it is difficult to prevent unauthorized persons from access a web page because more than 20 million people in the world has access to the Internet.

Consequently, there is a need to have an improved system for distributing information electronically.

SUMMARY OF THE INVENTION

The present invention uses two channels to deliver digital information: a broadcast channel and a bi-directional channel. The broadcast channel is used to deliver the bulb of the digital information to subscribers. The amount of information delivered is preferably sufficient to satisfy the needs of a large number of subscribers so that they do not have to obtain additional information using the bi-directional channel. The broadcast information is stored on fast storage media located at subscriber sites. As a result, search and retrieval of the broadcast information is quick. Further, the broadcast information is processed locally using a dedicated on-site processor instead of relying on the computers of the information distributors. As a result, the load on the computers of the information distributors is reduced. If the subscribers desire to receive additional information relating to the broadcast information, the bi-directional communication channel is used to transmit the request and the requested information.

The distribution costs of broadcast channels are typically much lower than that of a bi-directional communication channel. Consequently, the major portion of information is delivered using low cost distribution channels. For a large number of subscribers, the broadcast information will provide all the information they normally need. Thus, expensive bi-directional communication channels are used only occasionally.

These and other features and advantages of the present invention will be fully understood by referring to the following detailed description in conjunction with the accompanying drawings.

BRIEF DESCRIPTION OF THE DRAWINGS

FIG. 2A shows a newspaper article as displayed on a monitor of the information distribution system shown in FIG. 1.

FIG. 2B shows the contents of the broadcast information which corresponds to the newspaper article of FIG. 2A.

FIG. 4 shows an embodiment of the present invention used in a data communication network.

DETAILED DESCRIPTION OF THE INVENTION

Figure 1:
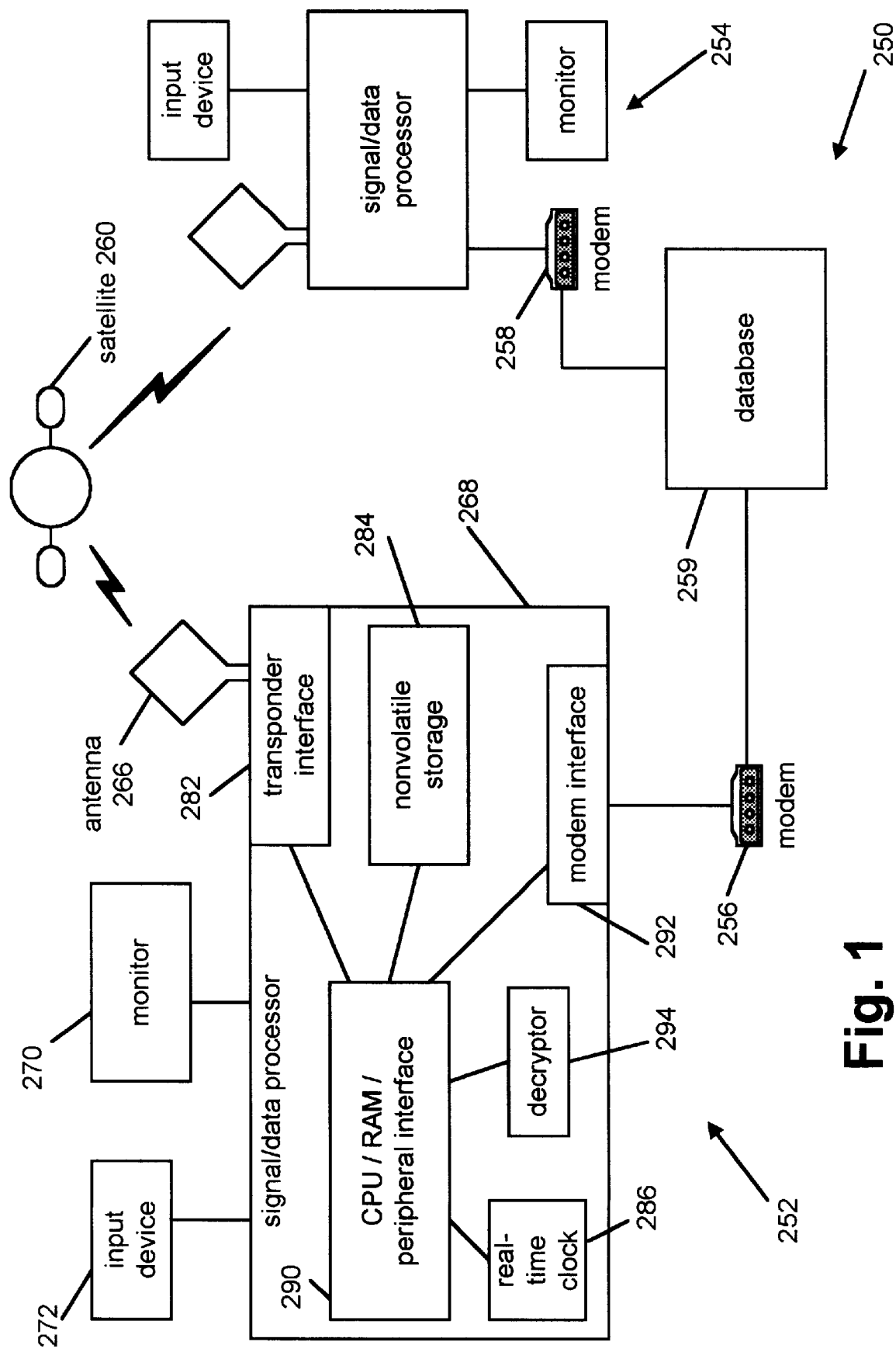
FIG. 1 is a schematic drawing showing an embodiment of an information distribution system of the present invention.

The present invention comprises a novel information distribution and processing system and related methods. The following description is presented to enable any person skilled in the art to make and use the invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

The present invention can be used to solve the above described problem of digital information delivery. It uses two channels to deliver digital information: a broadcast channel and a bi-directional channel. The broadcast channel is used to deliver the bulb of the digital information from a source to subscribers. The time for broadcasting is preferably during a time of low communication load (e.g., off-peak hours). Upon receiving, the broadcast information is stored on storage media located at subscriber sites. If the subscribers desire to receive additional information relating to the broadcast information, the bi-directional communication channel is used to transmit the request and the requested information.

The data transfer rate of the storage media (more than a million bytes per second) could be hundreds of times faster than that of a modem. As a result, search and retrieval of the broadcast information is quick. Further, the broadcast information is processed locally using a dedicated on-site processor instead of relying on the computers of the information distributors. As a result, the load on the computers of the information distributors is reduced. Even though the requested information is delivered using a regular low bandwidth communication channel, the performance of the system would not be severely affected because the requested information is only a small fraction of the broadcast information.

In one embodiment of the present invention, the broadcast information can be sent in the clear while the requested information (which may contain commercially valuable information) is encrypted. Because the amount of requested information is a small fraction of the broadcast information, there is no need to use much computer resource to process the requested (and encrypted) information. In a different embodiment of the invention, the broadcast information is encrypted using a simple algorithm while the requested information is encrypted using a complex algorithm. Even though extra computer resource is used to decrypt the broadcast information, this embodiment may be useful for the case where it is not desirable for the public to view the broadcast information.

It should be noted that the word "channel" is not limited to a specific kind of physical communication link. The word "channel" merely means a path for communicating information. The term "broadcast channel" means a path allowing an information source to deliver digital information to many recipients almost simultaneously. The term "bi-directional channel" means a path allowing one-to-one interactive communication between a source and a recipient. These two "channels" could use the same physical communication link (e.g., telephone lines, television cable lines, wireless, optical links, etc.) to perform their respective functions. That is, the same physical communication link can support both broadcast and bi-directional channels.

FIG. 1 is a block diagram of an information distribution system 250 in accordance with the present invention. In this embodiment, system 250 is designed to electronically distribute digital newspaper. It should be pointed out that system 250 can also be used advantageously to distribute other types of digital information. System 250 contains a plurality of subscriber units (such as units 252 and 254) each connected to a bi-directional communication channel (e.g., modems 256 and 258 coupled to units 252 and 254, respectively) and a satellite transponder 260 for broadcasting digital data to these subscriber units. Modems 256 and 258 may be coupled to a database 259 via line-based or wireless telephone communications. In system 250, satellite transponder 260 is used to broadcast the content of a newspaper to the subscriber units while telephone modems 256 and 258 allow delivering additional information (stored in database 259) to subscriber units 252 and 254, respectively, on a demand basis.

The structure of these subscriber units are substantially identical; consequently, only one of these units, such as unit 252, is described in detail. Unit 252 contains an antenna 266 for receiving broadcast signals from satellite transponder 260, a signal/data processor 268 for performing signal and data processing functions, a monitor 270 for displaying the digital newspaper, and an input device 272 (such as a keyboard and/or a mouse).

Signal/data processor 268 contains a transponder interface 282 for processing transponder signal received from antenna 266. Transponder interface 282 preferably contains a low noise receiver for receiving high frequency (e.g., C or Ku band) transponder signal and a universal data interface for converting the transponder signal to digital data. The retrieved data is stored in nonvolatile storage 284, such as a hard disk or solid state flash memory. Preferably, satellite transponder 260 broadcasts the newspaper data at predetermined times. Thus, a realtime clock 286 is preferably used to turn on interface 282 at the predetermined times. Processor 268 contains a microcomputer 290 which coordinates the operation of clock 286, nonvolatile storage 284, and interface 282. Microcomputer 290 preferably contains a central processing unit (CPU), random access memory (RAM) and peripheral interface devices. Processor 268 also contains a communication interface 292 for sending and receiving digital data from database 259 through modem 256.

The time for broadcast is preferably chosen when communication load of transponder 260 is at a low level (e.g., around mid-night). As a result, the cost of information delivery is low. Alternatively, the time of broadcasting is chosen by transponder 260 because it knows when communication load is light. In this case, transponder 260 first sends a signal to signal/data processor 268 for alerting processor 268 to receive and process the newspaper information.

A user can use the input device 272 and monitor 270 to read the content of the digital newspaper stored in nonvolatile storage 284. In one embodiment, the complete content of the newspaper is stored in nonvolatile storage 284. The term "complete content" means that the user is able to read the newspaper without relying on information stored in database 259 (although other embodiments may deliver less than the complete content). In this aspect, system 250 functions in a similar way as the distribution of a conventional printed newspaper. However, the digital data of the digital newspaper delivered by satellite transponder 260 preferably contains linkage references (such as pointers) which allow fast retrieval of additional information from database 259.

If the newspaper information received from satellite transponder 260 is sufficient to satisfy the needs of a user, signal/data processor 268 will not activate modem 256. However, if the user wishes to receive additional information relating to an item mentioned in the digital newspaper (e.g., by selecting at the item using the input device), processor 268 will retrieve the information stored in database 259 using the embedded linkage reference.

In system 250 of the present invention, the received digital newspaper (including graphics and other multimedia contents) is stored in nonvolatile storage 284, which has fast access time. Further, a dedicated processor (i.e., microcomputer 290) is used to process newspaper information. On the other hand, prior art on-line newspaper distribution systems rely on modem to deliver the content of the newspaper stored in a central site. Further, the processor in the central site has to serve many users in delivering the newspaper. As a result, system 250 has superior performance compared to prior art on-line newspaper delivery systems.

In one embodiment of the present invention, commercially valuable information is encrypted and stored in database 259. The broadcast information does not contain this information. Thus, in this embodiment less than the complete content is delivered by the broadcast channel. In this case, the broadcast information would not be useful unless a decryption key is available to decrypt the information obtained from database 259. As a result, only subscribers who have a decryption key are able to obtain meaningful information from the newspaper. In the case, microcomputer 290 also performs decryption functions. Alternatively, a separate decryptor 294 can be included in signal/data processor 268.

It should be appreciated that even though only one database is shown in FIG. 1, the valuable information could be distributed to several databases. Further, the digital newspaper and database 259 could be physically located in the same site.

If it is not desirable for the public to read the broadcast information, the data transmitted by transponder 260 could also be encrypted. In this case, simple encryption algorithm needs to be used to encrypt the broadcast information while complex encryption algorithm is used to encrypt the valuable information in database 259. A potential hacker would not be motivated to decrypt (and make public) the broadcast information unless he/she can also decrypt the valuable information.

FIG. 2A shows an example of a portion of a newspaper article as seen on monitor 270. In FIG. 2A, the terms which a user may obtain additional information are underlined (or highlighted in other ways, such as setting in different colors, depending on the choice of the publisher). If desired, the user may select these terms using a pointing device, such as a mouse, and signal/data processor 268 will obtain the additional information from database 259.

FIG. 2B shows the same portion in FIG. 2A as transmitted by transponder 260 (for is simplicity, other embedded formatting codes, such as center, bold, etc., are not shown). Each of the terms underlined in FIG. 2A are enclosed by a special symbol (e.g., the "♈" symbol) and followed by a linkage reference enclosed by another special symbol (e.g., the "⌘" symbol). These symbols are invisible to the users and is recognizable only by microcomputer 290. The linkage information could be as simple as a pointer.

When an underlined term in FIG. 2A is selected by a user, microcomputer 290 extracts the linkage reference and transmits it to database 259. The linkage reference allows database 259 to retrieve the necessary information quickly without doing extensive searches. As a result, the response time of system 250 is fast. The retrieved information can itself contains linkage references and can be searched.

If the speed of searching and retrieving data by database 259 is fast, it may not be necessary to include linkage reference in the broadcast information transmitted by transponder 260. In this case, the user selects (e.g., using the mouse) words and terms he/she is interested in. Signal/data processor 268 transmits the selected items to database 259, which searches for matches in its database. Matched information is sent to subscriber unit 252 for processing.

The bi-directional channel also allows updating of the broadcast information. There is typically a time difference between the broadcast and display of information. New information gathered during this time difference can be stored in database 259 and later transmitted to signal/data processor 268.

In this embodiment of the present invention, satellite transponder 260 is used as the vehicle to electronically broadcast newspaper. However, other broadcast distribution methods can be used. One method is to use the Internet to broadcast the information. Also note that the broadcast distribution channels do not have to be electrical. For example, the present invention allows the distribution of CDROMs encoded with digital information to the subscriber sites. In the case of electrical broadcast communication channels, both wired and wireless can be used. Preferably, unidirectional channels are used for broadcast because of their low cost; however, the present invention does not preclude the use of bi-directional communication channels (such as telephone lines) as means for distributing broadcast (i.e., one to many) information.

Current technology allows the size of antenna 266 to be as small as 2 feet. The costs of antenna 266 and transponder interface 282 is already low enough to be within the reach of small business or a typical household. The newspaper publisher has to pay for the use of the transponder. However, the costs is comparable to the printing and distribution costs of printed newspaper. It is anticipated that the costs of the newspaper distribution system in accordance with the present invention will be lowered as the number of subscribers increases.

Figure 3:
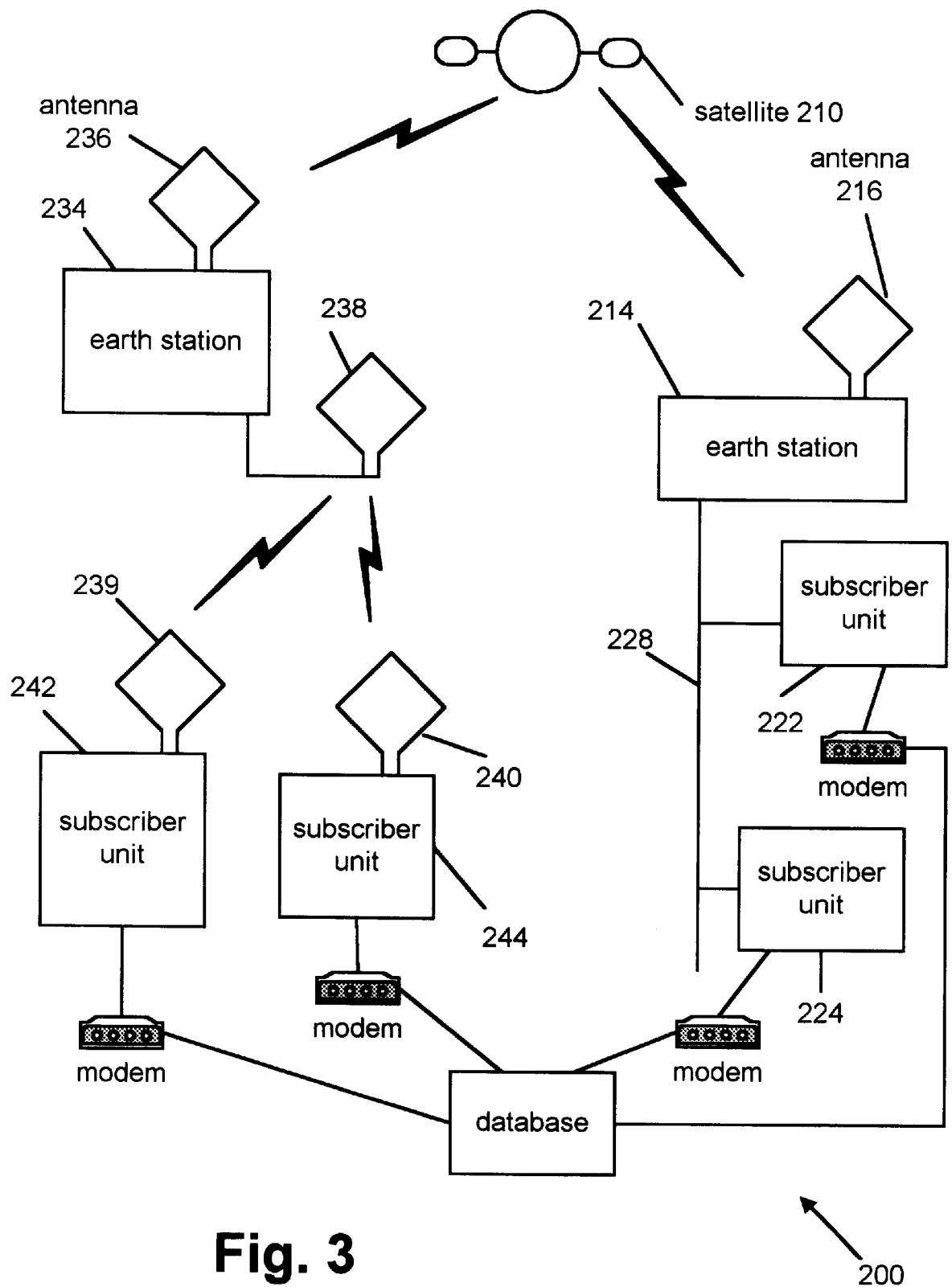
FIG. 3 shows another embodiment of the information distribution system of the present invention.

FIG. 3 shows another embodiment of a newspaper distribution system 200 of the present invention. System 200 contains a satellite transponder 210, an earth station 214, and a plurality of subscriber units, such as units 222 and 224. Transponder 210 functions in a similar way as transponder 260 of FIG. 1 and subscriber units 222 and 224 flnction in a similar way as subscriber units 252 and 254 of FIG. 1. Earth station 214 receives digital data transmitted by transponder 210 using an antenna 216. The data is distributed to subscriber units 222 and 224 via wired communication channel 228, such as cable and optic fiber. Other earth stations could be placed in strategic locations throughout the country to serve their respective subscribers in a similar manner as earth station 214 and subscriber units 222 and 224. As a result, a large geographic area can be served simultaneously by satellite transponder 210. The advantage of this embodiment is that the equipment costs incurred by the subscriber units are low.

In some locations, it may not be desirable to use wired communication channel to link an earth station to subscribers. In such case, wireless communication channel could be used. FIG. 3 shows an earth station 234 which receives transponder signal from transponder 210 using an antenna 236. Earth station 234 in turn broadcasts the digital data to its subscribers, such as subscriber units 242 and 244.

FIG. 3 shows a plurality of modems that are connected to subscriber units 222, 224, 242 and 244. These modems are connected to a database 246. These parts of FIG. 3 is similar to the corresponding part of FIG. 1. It should be noted that wired communication channel 228 may also be used as a bi-directional communication channel for accessing database 246.

In one embodiment of system 200, teletext technology is used to link earth station 234 and subscriber units 242 and 244. Thus, earth station 234 could be located adjacent to a television transmission station. The digital data received by earth station 234 can be integrated to the vertical blanking interval of a TV signal, which is broadcasted using an antenna 238. Subscriber units 242 and 244 receive the signal using antennas 239, and 240, respectively. The digital data is then retrieved. Various improvements and refinements of the teletext technology are well known and can be incorporated into system 200.

It should be obvious to a person skilled in the art that systems 250 and 200 are not limited to the distribution of newspaper. Further, digital newspapers of the future may contains contents which are not available in the printed version, such as multimedia compositions. Other information, such as magazines, graphic images, electronic mails, computer games, multimedia work, or interactive movie, could also be advantageously distribution using a system similar to systems 250 and 200. For example, if it is desirable to distribute interactive movie, the non-interactive portion can be broadcast while the interactive portion is delivered using a bi-directional channel.

The present invention can also be used in information distribution using a digital data network. FIG. 4 is a drawing showing a network system 500 of the present invention. System 500 contains a data communication network 502, which could be a local area network or a wide area network. System 500 also contains a plurality of client computers (such as computers 506–508) and a plurality of server computers (such as servers 516 and 518). These computers are connected to network 502 using a plurality of network access devices 510–514 (such as modems for connecting the client computers to dial-up lines and channel service units for connecting the server computers to T1 lines or lines of higher data rates). Preferably, the digital newspaper data and the database is stored in the servers. The digital newspaper data will be broadcasted by a server to the client computers either at a predetermined time or upon request. Upon receiving the broadcast data, the clients stores the data in its nonvolatile memory (such as its hard disk).

The structure of the client computers could be similar to subscriber unit 252 of FIG. 1, except that the antenna (such as antenna 266) may correspond to the connection from the client computers to network 502 and interface 282 may correspond to the network access device. For example, client computer 510 may contain a signal/data processor 521, a monitor 522, an input device 523 and an antenna 524. The client computers can communicate with the database server (which corresponds to database 259 of FIG. 1). It should be noted that both the database and the digital newspaper data could be located on the same server. Further, the digital newspaper data and the database information could be distributed among many servers.

In FIG. 1, the bi-directional channel is a separate physical communication link (i.e., telephone 256, which is different from a satellite link). In FIG. 4, it is possible to use network 502 as both the broadcast channel and the bi-directional channel. Consequently, the same physical link supports both broadcast and bi-directional channels. Thus, these channels are defined by their functionality instead of by their physical characteristics.

In the Internet, information can be broadcasted by sending the same information to a plurality of electronic mail or URL addresses. Alternatively, information can be sent using a multicasting protocol. The client computers contain a browser which could read the broadcast digital information. The database server contains a plurality of files containing information related to the broadcast information. In the Web environment, the broadcast information is a hypertext markup language ("HTML") document contains links (e.g., in the form of HTML "tags" containing URL addresses of these related files in the database server). A user can use a browser running on a client computer to read the broadcast HTML document. These tags are typically rendered as highlighted text or images by the browser. Upon seeing these indication of links, a user can click on these indications, and the client computers can accesses information in selected files by sending requests to these URL addresses. The server can then deliver the requested information to the subscribers using standard Web protocol. As pointed out above, these files may be encrypted, and only authorized users can read the content of these files.

Some networks systems support distributive processing. These networks allows "applets" to be distributed from one computer (client and sever) to another computer for execution. An example of such a system is the Java and HotJava environment on the Web. The present invention can be applied to these network systems. Only some of the applets (preferably the most important ones) need to be encrypted while most of the applets can be sent in the clear (or slightly encrypted).

In the embodiments shown in FIGS. 1, 3 and 4, the encryption can be performed at the time information in the database is delivered to the subscribers. Different encryption keys could be used. Methods of delivering the decryption keys to the subscribers via insecure communication channels have been described above, and will not be repeated here.

There has thus shown and described a novel information distribution and process system. Many changes, modifications, variations and other uses and application of the subject invention will become apparent to those skilled in the art after considering this specification and the accompanying drawings. All such changes, modifications, variations, uses, and applications are covered by the scope of this invention which is limited only by the appended claims.

I claim:

1. A device located in one of a plurality of sites for receiving radio frequency signals broadcasted by a remote transmitter and for communicating with a remote database through a bi-directional channel, said device being connected to a display, said database containing a first set of digital data and means for communicating with said remote sites using said bi-directional channel, said device comprising:

a receiver for receiving said radio frequency signals;

an interface for retrieving a second set of digital data from said radio frequency signals, said second set of digital data comprising a plurality of regular displayable items, a plurality of formatting codes, a plurality of special displayable terms, a first non-displayable symbol, a plurality of linkage references, and a second non-displayable symbol, said special displayable terms being highlighted when displayed by said display, said first non-displayable symbol being used by said device for recognizing said special displayable terms, said second non-displayable symbol being used by said device for recognizing said plurality of linkage references, each of said plurality of linkage references being used for retrieving a portion of said first set of digital data, and each of said plurality of special displayable terms being associated with one of said plurality of linkage references;

means for highlighting said plurality of special displayable items;

means for detecting a selection of at least one of said plurality of special displayable items;

means for extracting a linkage reference associated with said selected special displayable items; and means for sending said extracted linkage reference to said remote database through said bi-directional channel.

2. The device of claim 1 wherein at least one of said first set of digital data and said second set of digital data is encrypted, and said device further comprising a decryptor for decrypting said encrypted digital data.

3. The device of claim 1 wherein said means for sending to said remote database comprises a modem.

4. The device of claim 1 wherein said radio frequency signals are television signals.

5. The device of claim 4 wherein said second set of digital data is integrated into vertical blanking intervals of said television signals.

6. The device of claim 4 further comprising:

a memory; and means for delivering said retrieved second set of digital data to said memory.

* * * * *